(12) United States Patent
Miyazaki et al.

(10) Patent No.: US 8,833,419 B2
(45) Date of Patent: *Sep. 16, 2014

(54) METAL CORD, RUBBER-CORD COMPLEX AND PNEUMATIC TIRE USING THE SAME

(75) Inventors: Shinichi Miyazaki, Kobe (JP); Junichi Kodama, Futtsu (JP); Yasuo Sakai, Utsunomiya (JP); Keisuke Aramaki, Utsunomiya (JP); Yuichi Sano, Utsunomiya (JP); Kenichi Okamoto, Itami (JP)

(73) Assignees: Sumitomo Rubber Industries, Ltd., Kobe (JP); Nippon Steel & Sumitomo Metal Corporation, Tokyo (JP); Sumitomo (SEI) Steel Wire Corp., Itami-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,176

(22) Filed: Feb. 15, 2012

(65) Prior Publication Data
US 2012/0145297 A1 Jun. 14, 2012

Related U.S. Application Data

(62) Division of application No. 12/085,347, filed as application No. PCT/JP2006/323963 on Nov. 30, 2006, now abandoned.

(30) Foreign Application Priority Data

Dec. 1, 2005 (JP) .................................. 2005-348182

(51) Int. Cl.
*B60C 9/00* (2006.01)
*C25D 5/10* (2006.01)
*D07B 1/06* (2006.01)
*C25D 7/06* (2006.01)
*B60C 9/20* (2006.01)
*C25D 5/50* (2006.01)
*C25D 5/48* (2006.01)

(52) U.S. Cl.
CPC ............... *C25D 7/0607* (2013.01); *C25D 5/10* (2013.01); *D07B 2201/2011* (2013.01); *D07B 2501/2046* (2013.01); *D07B 1/0666* (2013.01); *D07B 2401/2035* (2013.01); *B60C 9/2006* (2013.01); *D07B 2501/2076* (2013.01); *C25D 5/50* (2013.01); *C25D 5/48* (2013.01); *D07B 2401/2095* (2013.01); *D07B 2205/3089* (2013.01); *B60C 9/0007* (2013.01)
USPC ........................................................ 156/451

(58) Field of Classification Search
USPC ........................................ 156/150, 151, 451
See application file for complete search history.

(56) References Cited

U.S. PATENT DOCUMENTS 3,291,707 A * 12/1966 Abbey et al. .................. 205/143
3,749,558 A * 7/1973 Dillenschneider ............ 428/675

(Continued)

FOREIGN PATENT DOCUMENTS

EP 0 230 071 A1 7/1987
EP 1295985 A1 * 3/2003

(Continued)

*Primary Examiner* — Daniel McNally
(74) *Attorney, Agent, or Firm* — Birch, Stewart, Kolasch & Birch, LLP

(57) ABSTRACT

A rubber-cord complex having an improved wet heat adhesive property between a rubber and a cord comprising a drawn plated wire, and including a metal cord comprising a drawn plated wire prepared by providing a brass plated layer on the surface of an element wire and drawing the resulting plated wire, and a rubber vulcanized and bonded to the cord, wherein in a wet heat deterioration state of the drawn plated wire after being subjected to the vulcanization to bond the rubber thereto and further held under an atmosphere having a temperature of 50 to 100° C. and a humidity of 60 to 100% for one hour to 20 days, the average grain size of crystal grains present in the brass plated layer is not more than 50 nm, and the grain boundary of the crystal grains has a fractal dimension of 1.001 to 1.500.

4 Claims, 5 Drawing Sheets

(56) References Cited

U.S. PATENT DOCUMENTS

| | | | |
|---|---|---|---|
| 4,347,290 A * | 8/1982 | Haemers | 428/625 |
| 4,545,834 A | 10/1985 | Shemenski et al. | |
| 4,645,718 A | 2/1987 | Dambre | |
| 4,677,033 A | 6/1987 | Coppens et al. | |
| 4,704,337 A | 11/1987 | Coppens et al. | |
| 5,100,517 A * | 3/1992 | Starinshak et al. | 205/138 |
| 6,475,640 B1 | 11/2002 | Doujak et al. | |
| 6,706,418 B2 | 3/2004 | Egli et al. | |
| 2002/0055011 A1 | 5/2002 | Brabant et al. | |
| 2004/0247865 A1 | 12/2004 | Pavan | |
| 2007/0261965 A1 | 11/2007 | Heller et al. | |
| 2012/0199259 A1 * | 8/2012 | Miyazaki et al. | 152/451 |

FOREIGN PATENT DOCUMENTS

| | | |
|---|---|---|
| JP | 62-288634 A | 12/1987 |
| JP | 5-21990 B2 | 11/1989 |
| JP | 2-61187 A | 3/1990 |
| JP | 6-184966 A | 7/1994 |
| JP | 2003-94108 A | 4/2003 |
| JP | 2003-96594 A | 4/2003 |
| JP | 2003-231992 A | 8/2003 |
| JP | 2003-239183 A | 8/2003 |
| JP | 2006-283270 A | 10/2006 |
| JP | 2007-9343 A | 1/2007 |

\* cited by examiner

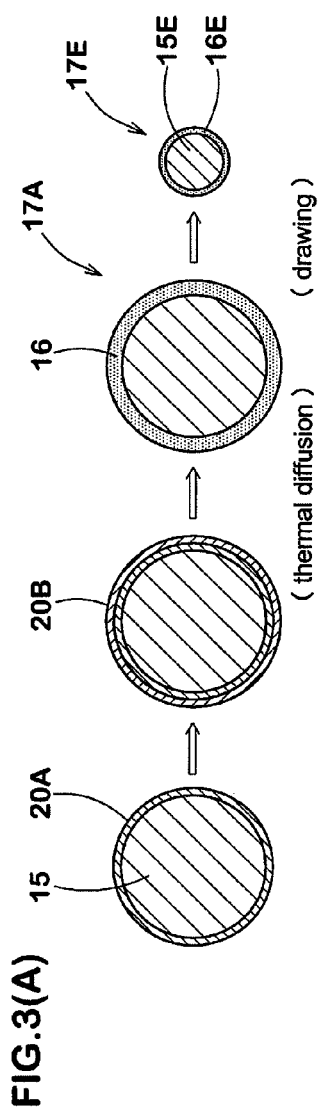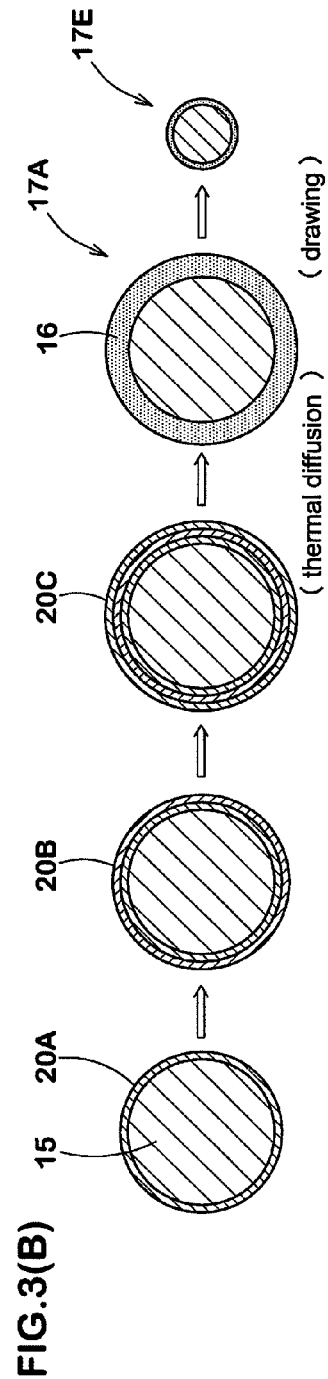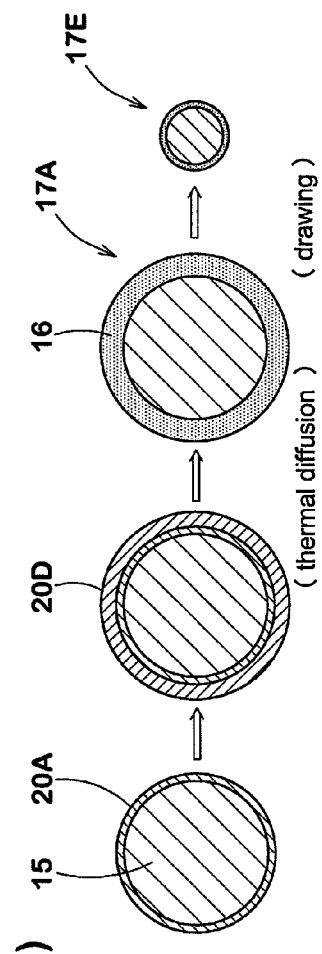

METAL CORD, RUBBER-CORD COMPLEX AND PNEUMATIC TIRE USING THE SAME

This application is a Divisional of application Ser. No. 12/085,347, filed on Jul. 22, 2008, now abandoned which is a National Phase of PCT International Application No. PCT/JP2006/323963, filed on Nov. 30, 2006, which claims the benefit of Patent Application No. 2005-348182, filed in Japan on Dec. 1, 2005. The entire contents of all of the above applications are hereby incorporated by reference.

TECHNICAL FIELD

The present invention relates to a metal cord and a rubber-cord complex in which the state of a grain structure or the like of a brass plated layer of a plated element wire is specified to suppress deterioration in adhesiveness between the plated wire and the rubber under a wet heat environment, and a pneumatic tire using the complex.

BACKGROUND ART

As a reinforcing element for rubber products such as pneumatic tires, hoses and industrial belts, a metal cord has been popularly used from the viewpoints of good reinforcing effect and the like. In a rubber-cord complex such as a rubber product reinforced with such a metal cord, the surface of element wires of the cord is plated with brass containing copper and zinc in order to enhance the adhesive property of the metal cord to the rubber. Typically, this brass plating is performed in such a manner as sequentially forming a copper plated layer and a zinc plated layer on the surface of an element wire and then subjecting them to thermal diffusion to give an alloy of the two metals.

It is known that the adhesive property between the brass plated layer and the rubber is revealed by formation of an adhesion reaction layer between the brass plated layer and the rubber through a cross-linking reaction which occurs between copper in the brass plated layer and sulfur incorporated into the rubber during vulcanization of the rubber.

DISCLOSURE OF INVENTION

Problem to be Solved by the Invention

However, although a conventional brass plating has a good adhesive property in an initial stage after the vulcanization (initial adhesive property), it tends to be poor in wet heat adhesive property such that the adhesive property decreases under a wet heat environment at high temperature and high humidity and the brass plating is more likely to separate from the rubber. It is effective for improving the wet heat adhesive property to add an organocobalt salt to the rubber. However, the organocobalt salt is expensive, and has a property of making an unvulcanized rubber apt to deteriorate or thermally deteriorate. Hence the amount of the organocobalt salt to be incorporated is limited, so a sufficient increase in wet heat adhesive property is not achieved thereby.

As other technologies to improve the wet heat adhesive property are known a method of suppressing diffusion of copper into rubber, as disclosed in JP-A-2003-096594, wherein the content of copper in the brass plated layer is limited to 62% or less to suppress excessive formation of a sulfide at the interface with the rubber, and a method of suppressing corrosion reaction and adhesion reaction at the interface with the rubber, as disclosed in JP-A-2003-094108 and JP-B-1812616, by plating a ternary alloy of copper, zinc and nickel as a brass plating. However, in these methods, no investigation about structure of plated layer (structure of reaction layer) optimum to improvement of wet heat adhesive property has been made from the viewpoint of mechanism of wet heat deterioration. As a result, the effects are limitative and do not reach a practical level.

In view of such circumstances, the present inventors conducted a study and have found that cracking which occurs in a plated layer and then proceeds to peeling off when a rubber-cord complex deteriorates under wet heat environment, occurs starting from a coarse grain structure portion in the plated layer where crystal grains are large. Thus, it has been found that for improving the wet heat adhesive property, it is particularly effective to:

(1) make the grain structure of the plated layer fine to suppress occurrence of cracking in the plated layer so as to enhance resistance to peeling; and (2) increase irregularities of the grain boundaries (peripheral surface) of the crystal grains to suppress development of cracks along the gain boundaries.

A primary object of the present invention is to provide a rubber-cord complex having a wet heat adhesive property improved basically by specifying the granular state of crystal grains in a brass plated layer.

A further object of the present invention is to provide a metal cord suitable for use in the rubber-cord complex and capable of improving its wet heat adhesive property to a rubber vulcanized and adhered thereto.

A still further object of the present invention is to provide a pneumatic tire with its durability improved by the use of the rubber-cord complex.

Means to Solve the Problem

One embodiment of the present invention is directed to a rubber-cord complex obtained by vulcanizing a rubber to adhere it to a metal cord comprising a drawn plated wire prepared by providing a plated layer of brass containing copper and zinc on the surface of a metal wire and drawing the resulting plated wire, wherein in the wet heat deterioration state of the metal cord to which the rubber has been vulcanized and bonded and which has been held in an atmosphere having a temperature of 50 to 100° C. and a humidity of 60 to 100% for one hour to 20 days, the average grain size of crystal grains present in the brass plated layer is not more than 50 nm, and the grain boundary of the crystal grains has a fractal dimension of 1.001 to 1.500.

Another embodiment of the present invention is directed to a metal cord for use in the rubber-cord complex described above, wherein the brass plated layer is formed by thermal diffusion of a copper plated layer and a zinc plated layer formed by plating in layers on a metal wire, in which the copper plated layer is formed by plating at a current density of 15 to 25 $A/dm^2$, the zinc plated layer is formed by plating at a current density of 40 to 60 $A/dm^2$, and the thermal diffusion is conducted by a low temperature diffusion at a temperature of 500 to 550° C.

Another embodiment of the present invention is directed to a metal cord for use in the rubber-cord complex described above, wherein the brass plated layer is formed by thermal diffusion of a copper plated layer and a plated layer of a zinc alloy selected from a zinc-nickel alloy and a zinc-cobalt alloy, the layers being formed in layers on a metal wire, in which the copper plated layer is formed by plating at a current density of 15 to 25 $A/dm^2$, the zinc alloy plated layer is formed by plating at a current density of 40 to 60 A/dm², and the thermal diffusion is conducted by a low temperature diffusion at a temperature of 500 to 550° C.

Another embodiment of the present invention is directed to a pneumatic tire in which the rubber-cord complex described above is used as a ply for tire reinforcement.

Effects of the Invention

As stated above, in the present invention, the grain structure of the plated layer is made fine by restricting the average grain size of the crystal grains in the brass plated layer in the wet heat deterioration state to 50 nm or less. It is thereby possible to suppress generation of cracks in the plated layer to allow enhancement of a resistance to its peeling. Further, irregularities of the grain boundaries of the crystal grains in the plated layer are increased and complicated such that the fractal dimension of the grain boundary falls within the range of 1.001 to 1.500, whereby development of cracking along the grain boundaries can be suppressed. By a synergistic effect of them, peeling damage of the plated layer caused by the cracking can be significantly suppressed so that improvement in wet heat adhesive property between the rubber and the cord can be achieved.

BRIEF DESCRIPTION OF THE DRAWINGS

FIG. 3A is a view explaining steps to form a brass plated layer of a binary alloy;

FIG. 3B is a view explaining steps to form a brass plated layer of a ternary alloy;

FIG. 3C is a view explaining another steps to form a brass plated layer of a ternary alloy;

Figure 1:
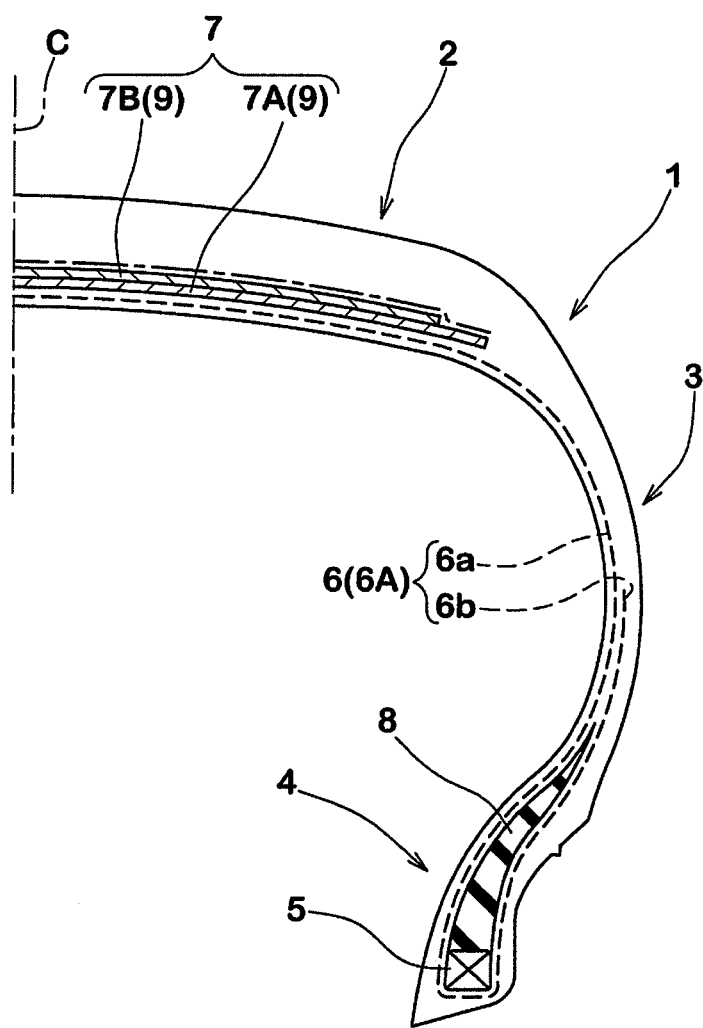
FIG. 1 is a cross sectional view showing an example of pneumatic tires in which a rubber-cord complex of the present invention is used as a ply for tire reinforcement.

| Explanation of reference numerals | |
|---|---|
| 1: | Pneumatic tire |
| 9: | Rubber-cord complex |
| 10: | Cord |
| 12: | Rubber |
| 15: | Element wire |
| 15E: | Element wire after drawing |
| 16, 16E: | Brass plated layer |
| 17A, 17E: | Plated wire |
| 20A: | Copper plated layer |
| 20B: | Zinc plated layer |
| 25: | Adhesion reaction layer |
| 30: | Crystal grains in plated layer |
| 30S: | Grain boundary |

BEST MODE FOR CARRYING OUT THE INVENTION

Figure 2:
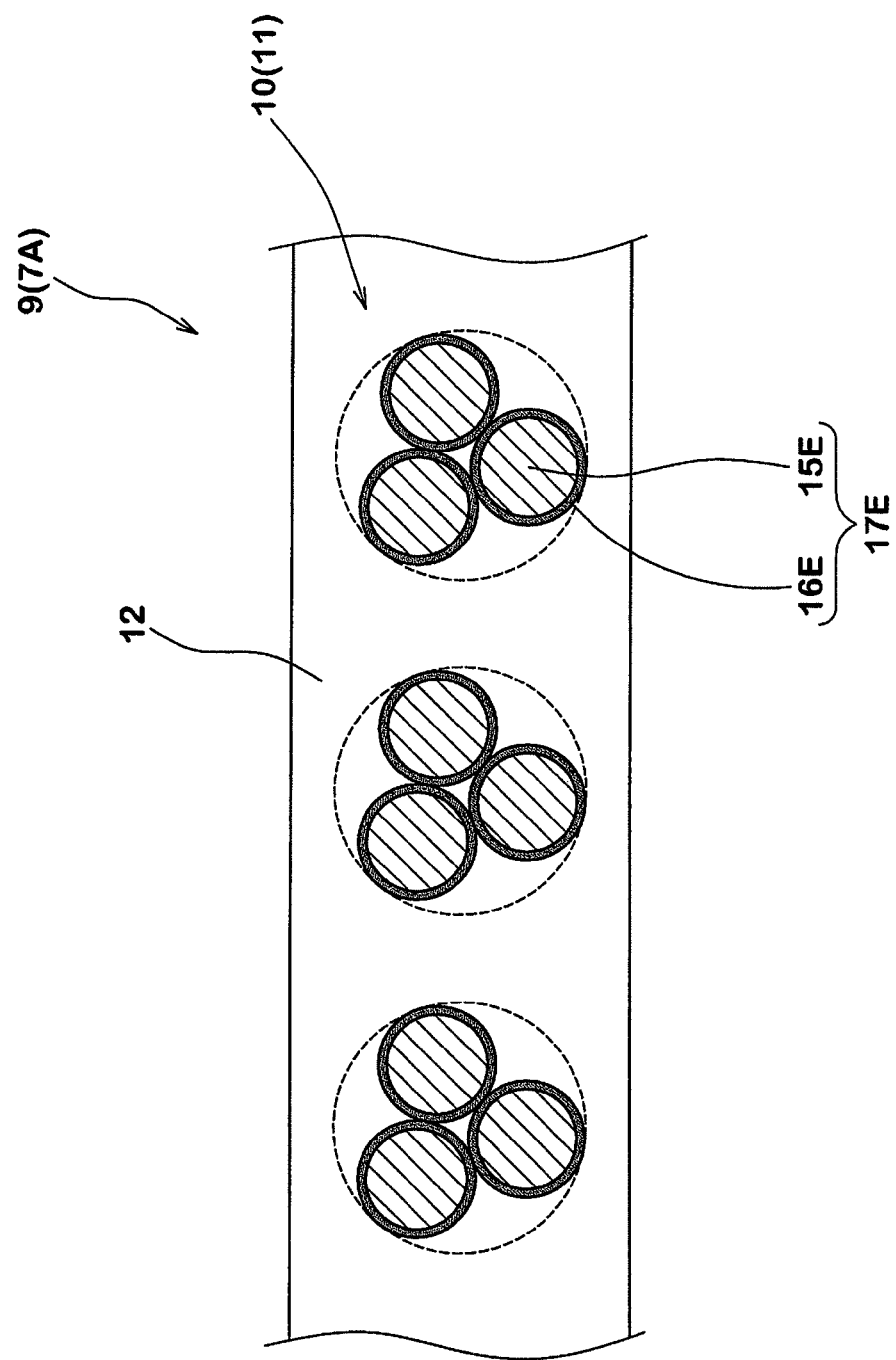
FIG. 2 is a cross sectional view showing the ply mentioned above which is the rubber-cord complex.

An embodiment of the present invention will be explained below along with illustrated examples. FIG. 1 is a cross sectional view showing a pneumatic tire in which a rubber-cord complex of the present invention is used as a ply for tire reinforcement. FIG. 2 is a cross sectional view showing the above-mentioned ply which is the rubber-cord complex.

In FIG. 1, a pneumatic tire 1 shown in this example is a radial tire for passenger cars, and it includes a carcass 6 extending from a tread portion 2 to bead cores 5 in bead portions 4 through sidewall portions 3, and a belt layer 7 arranged radially outward of the carcass 6 in the tread portion 2.

In this example, the carcass 6 is formed of one or more carcass plies 6A having carcass cords arranged, for example, at an angle of 75 to 90 degrees with respect to the circumferential direction of the tire. The carcass ply 6A comprises a ply main body portion 6a extending between the bead cores 5, 5, and ply turnup portions 6b that are turned up around the bead cores 5 from the inside to the outside at each end of the ply main body portion 6a. A bead apex rubber 8 extending radially outwardly from the bead core 5 in a tapered manner is disposed between the ply main body portion 6a and the ply turnup portion 6b, whereby a portion from the bead portion 4 to the sidewall portion 3 is reinforced.

The belt layer 7 comprises two or more belt plies, two belt plies 7A, 7B in this example, having belt cords arranged at an angle of 10 to 45 degrees with respect to the circumferential direction of the tire. The belt plies are stacked so that the belt cords in one ply intersects with those in another belt ply to thereby enhance the belt rigidity so as to firmly reinforce the tread portion 2.

In the present example, the rubber-cord complex 9 of the present invention is adopted to the belt plies 7A, 7B out of the plies for tire reinforcement including the carcass ply 6A and the belt plies 7A, 7B.

As shown in FIG. 2, the rubber-cord complex 9 is composed of a cord array body 11 that metal cords 10 as belt cords are arranged mutually in parallel, and a rubber 12 for topping formed by covering the surface and back of the cord array body 11 with the rubber and subjecting the rubber to vulcanization-bonding to the cord array body. The "vulcanization-bonding" is achieved by vulcanization heat applied when an unvulcanized green tire is vulcanized and molded in a mold.

As the rubber 12 for topping can be suitably used conventional rubbers for use in tires, in which sulfur is incorporated in a rubber base material. Besides sulfur, known additives, e.g., a vulcanization accelerator and a vulcanization acceleration assistant, are selectively used for the rubber 12 in order to obtain required physical properties of the rubber. As the rubber base material are preferably used diene rubbers such as natural rubber, isoprene rubber, butadiene rubber and styrene/butadiene rubber. The diene rubbers are used alone or in the form of a blend of two or more rubbers. Table 1 shows an example of a rubber composition for the rubber 12. The composition dose not contain any organocobalt salt as mentioned above.

TABLE 1

| Ingredients | Parts by weight |
|---|---|
| Natural rubber | 100 |
| Carbon black(HAF) | 60 |
| Zinc oxide | 8 |
| Antioxidant *1 | 2 |
| Mineral oil | 2 |
| Vulcanization accelerator *2 | 1 |
| Sulfur | 5 |

*1 2,2,4-trimethyl-1,2-dihydroquinoline polymer
*2 DZ: N,N'-dicyclohexyl-2-benzothiazolylsulfenamide The metal cord 10 is composed of at least one drawn plated wire 17E obtained by forming a brass plated layer 16 on the surface of a metal element wire 15 and drawing the resulting plated wire. In case that the metal cord 10 is composed of a plurality of drawn plated wires 17E, the wires 17E are twisted in a known twisting structure such as bundle-twisting or layer-twisting. A metal cord 10 having a 1×3 structure where three plated wires 17E are twisted is shown in FIG. 2.

The brass plated layer 16 is a brass-based plating containing copper and zinc as main components. In the present invention, it is possible to employ a binary alloy plating comprised of copper and zinc, or a ternary alloy plating containing, besides copper and zinc, cobalt or nickel as a third metal. In both cases of the binary alloy plating and the ternary alloy plating, it is preferable that the content of copper is in the range of 60 to 80 parts by weight and the content of zinc is in the range of 40 to 20 parts by weight, with respect to 100 parts by weight of the plating. Further, in the case of the ternary alloy plating, it is preferable that the content of cobalt is in the range of 0.1 to 5.0 parts by weight and the content of nickel is in the range of 1.0 to 10.0 parts by weight.

As shown in FIG. 3(A), the brass plated layer 16 made of the binary alloy plating is formed in such a manner that primary plated layers 20, i.e., a copper plated layer 20A and a zinc plated layer 20B, are formed one after another on the surface of a metal element wire 15, and then subjected to thermal diffusion to alloy the both metals (copper and zinc). Numeral 17A denotes a plated element wire prior to drawing, and numeral 17E denotes a plated wire after drawing. The copper plated layer 20A can be formed by electroplating treatment in a copper plating bath such as a copper pyrophosphate bath or a copper sulfate bath. The zinc plated layer 20B can be formed by electroplating treatment in a zinc plating bath such as a zinc sulfate bath. Further, the thermal diffusion is performed by thermally treating an element wire 15 having the copper plated layer 20A and the zinc plated layer 20B in a heating apparatus.

In the case of forming the brass plated layer 16 made of a ternary alloy plating, as shown in FIG. 3(B), in addition to the copper plated layer 20A and the zinc plated layer 20B, a third metal plated layer 20C is formed by electroplating treatment in a third metal bath which is a cobalt bath or a nickel bath, and the three layers are then thermally diffused and alloyed.

The order of formation of respective primary plated layers is not particularly restricted. However, in case that the element wire 15 is made of steel, it is not preferable to firstly form the zinc plated layer 20B from the viewpoint of the plating peeling property since a hard and fragile alloy phase of iron and zinc is produced on the surface of the element wire 15. Further, diffusion tends to occur with difficulty between the copper plated layer 20A and the third metal plated layer 20C as compared with an interface between other plated layers. Therefore, it is preferable not to dispose the copper plated layer 20A and the third metal plated layer 20C adjacently to each other. Therefore, in the case of the binary alloy plating, the order of the copper plated layer 20A and the zinc plated layer 20B is preferred, and in the case of the ternary alloy plating, the order of the copper plated layer 20A, the zinc plated layer 20B and the third metal plated layer 20C is preferred.

After formation of the brass plated layer 16, the plated wire 17A is subjected to a known wire drawing process to give a plated wire 17E drawn to a desired diameter. Numeral 16E denotes a brass plated layer in the drawn plated wire 17E, and numeral 15E denotes a wire 15 in the drawn plated wire 17E.

Further, another method for forming the brass plated layer 16 made of the ternary alloy plating is a method wherein, as shown in FIG. 3(C), the copper plated layer 20A is firstly formed on the surface of the metal wire 15 and, thereafter, a plated layer 20D of an alloy of zinc and nickel or an alloy of zinc and cobalt is formed on the copper plated layer 20A. Subsequently, the plated layers are subjected to thermal diffusion to give the brass plated layer 16. This alloy plated layer 20D can be formed by electroplating treatment in an alloy bath containing zinc sulfate and nickel or an alloy bath containing zinc sulfate and cobalt. When the brass plated layer 16 is formed in this manner, the content of the third metal in the external surface after the thermal diffusion decreases relatively as compared with the case of forming the third metal plated layer 20C as the outermost layer (the case shown in FIG. 3 (B)). It is therefore possible to improve the drawing processability in the wire drawing process.

Figure 4:
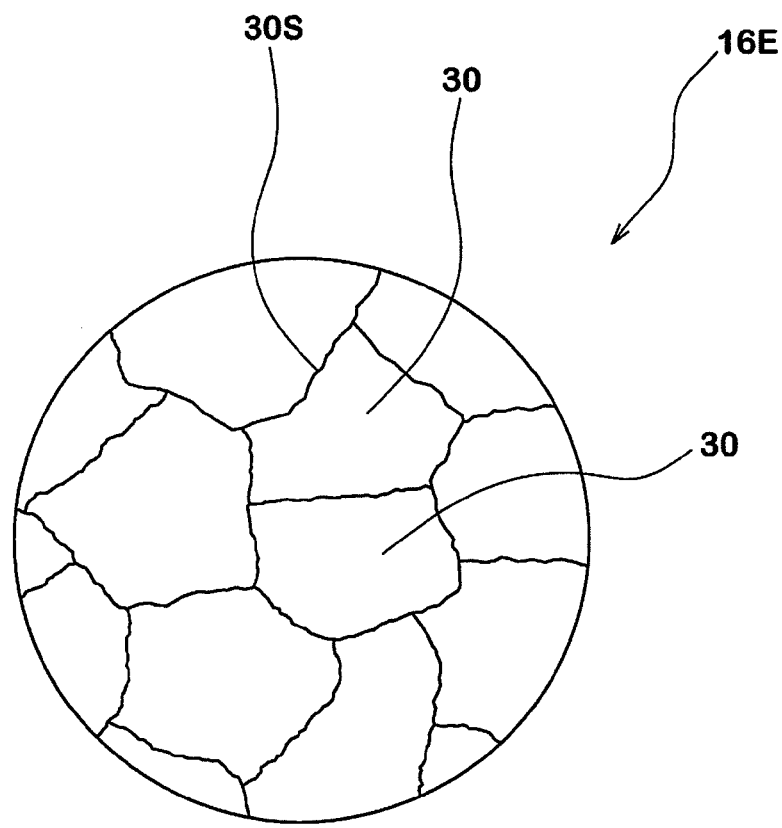
FIG. 4 is a conceptual view showing a grain structure state of a brass plated layer.

As a result of the study conducted by the present inventors, it has been found that, when the brass plated layer 16E of the drawn plated wire 17E undergoes wet heat deterioration, cracking is easy to occur in the brass plated layer 16 and it proceeds to peeling with cracks serving as starting points and, at that time, the cracking tends to occur starting from a coarse grain structure portion where crystal grains are large in the brass plated layer 16E. Thus, it has been found that for suppressing cracking of the brass plated layer 16E in wet heat deterioration and accordingly for improving the wet heat adhesive property, it is effective to:

(1) make the grain structure of the brass plated layer 16E fine to suppress occurrence of cracking in the brass plated layer 16E in wet heat deterioration to thereby enhance a resistance to peeling; and (2) increase irregularity of grain boundary 30S (peripheral surface) of crystal grains 30 in the brass plated layer 16E (FIG. 4) to complicate the grain boundary, thereby suppressing development of cracking along the gain boundary.

Thus, in the present invention, when the metal cord 10 in which the same rubber as the above-mentioned rubber 12 has been vulcanized and bonded, or the rubber-cord complex 9 itself, is in the wet heat deterioration state after being held in an atmosphere at a temperature of 50 to 100° C. and a relative humidity of 60 to 100% for one hour to 20 days, the crystal grains 30 present in the brass plated layer 16E are required to have an average grain size of not more than 50 nm, and the grain boundary 30S of the crystal grains 30 is required to have a fractal dimension of 1.001 to 1.500. In addition, in order to further ensure the effects of improvement in wet heat adhesive property, the wet heat deterioration environment is preferably set at a temperature of 70 to 100° C. and a relative humidity of 80 to 100% for a period of 10 to 20 days.

In the brass plated layer 16E whose crystal grains 30 are controlled to have an average grain size of not more than 50 nm, the grain structure of the plated layer is sufficiently fine. Therefore, it is possible to suppress occurrence of cracking in the brass plated layer 16E in wet heat deterioration so as to suppress peeling of the plating, thus improving the wet heat adhesive property. If the average grain size exceeds 50 nm, cracking becomes more likely to occur from a portion where the crystal grains have become coarse, resulting in decrease in wet heat adhesive property. Here, the "grain size" is defined by a diameter of a circle having the same area as the sectional area of a crystal grain 30. Further, the "average grain size" denotes a value obtained by averaging "grain sizes" of the crystal grains 30 in a plated layer. Specifically, a photograph of the grain structure of the plated layer is taken through a TEM (transmission electron microscope) and then subjected to image processing to obtain an average value (average grain size) of diameters of circle-equivalents of the crystal grains.

The lower limit of the average grain size is 5 nm or more from the viewpoint of possible upper limit of the current density.

As well known, the "fractal dimension" is an index for showing a complexity of a shape, a degree of irregularities of the surface, and the like. The larger the fractal dimension value, the more complex the irregularity is. In the present embodiment, the fractal dimension of the grain boundary 30S of the crystal grains 30 is set to not less than 1.001 so as to raise the degree of irregularity of the grain boundary 30S, thus providing a complex grain boundary. It is thereby possible to prevent development (growth) of cracks along the grain boundaries 30S. Even in the case of a fine grain structure wherein the average grain size of crystal grains 30 is not more than 50 nm, the wet heat adhesive property decreases if the fractal dimension is less than 1.001. Hence it is preferable that the fractal dimension is not less than 1.001, especially not less than 1.100. However, if the degree of irregularity becomes large to such an extent that the fractal dimension exceeds 1.500, the adhesive strength becomes poor for the reason that, for example, the thickness of an adhesion reaction layer 25 (FIG. 5) formed during vulcanization becomes insufficient, thus resulting in deterioration of initial adhesive property and wet heat adhesive property. Therefore, the upper limit of the fractal dimension is required to be 1.500 or less, preferably 1.300 or less.

Further, as well known, the "fractal dimension" can be obtained, for example, by a box counting method. Specifically, for example, a TEM photograph (transmission electron microscopic photograph) of a grain structure of a plated layer is subjected to image processing, as described above, to extract a curved line along the grain boundary 30S of the crystal grains 30. The fractal dimension of the extracted curved line is then obtained by the box counting method. In this box counting method, the curved line is divided into small square regions (boxes) each having one side with a length of "r", and while the length "r" is changed, the number of small regions (boxes) each including a segment of the target curved line is counted. The counted number of small regions (boxes) is plotted as ordinate and the length of "r" at the time of counting is plotted as abscissa on a logarithmic graph, and the fractal dimension is obtained from the inclination of the graph.

The brass plated layer 16E having such a fine grain structure can be formed by:
(A) setting the current density of electroplating higher than a conventional one in formation of the primary plated layers 20 (20A, 20B, 20C), to thereby previously make deposited grains fine; and
(B) setting the temperature (diffusion temperature) in thermal diffusion treatment lower than a conventional one, to thereby prevent alloy grains from growing during the heating.

Specifically, it is preferable that the current density in electroplating for the copper plated layer 20A is raised to the range of 15 to 25 A/dm$^2$, the current density in electroplating for the zinc plated layer 20B is raised to the range of 40 to 60 A/dm$^2$, and the thermal diffusion is performed at a low diffusion temperature within the range of 500 to 550° C. It should be noted that in a conventional brass plating of wires, the current density for the copper plated layer is set to about 10 A/dm$^2$, the current density for the zinc plated layer is set to about 20 A/dm$^2$, and the diffusion temperature is set to the range of 560 to 600° C. Further, in the case of conducting electroplating for the third metal plated layer 20C, it is preferable to raise the current density to the range of 30 to 40 A/dm$^2$.

Further, as shown in FIG. 3(C), in the case of forming a zinc alloy plated layer 20D, i.e., zinc/nickel alloy plated layer or zinc/cobalt alloy plated layer in place of the zinc plated layer 20B, the current density in electroplating for the zinc alloy plated layer 20D is set to the range of 40 to 60 A/dm$^2$, as in the case of the zinc plated layer 20B.

Figure 5:
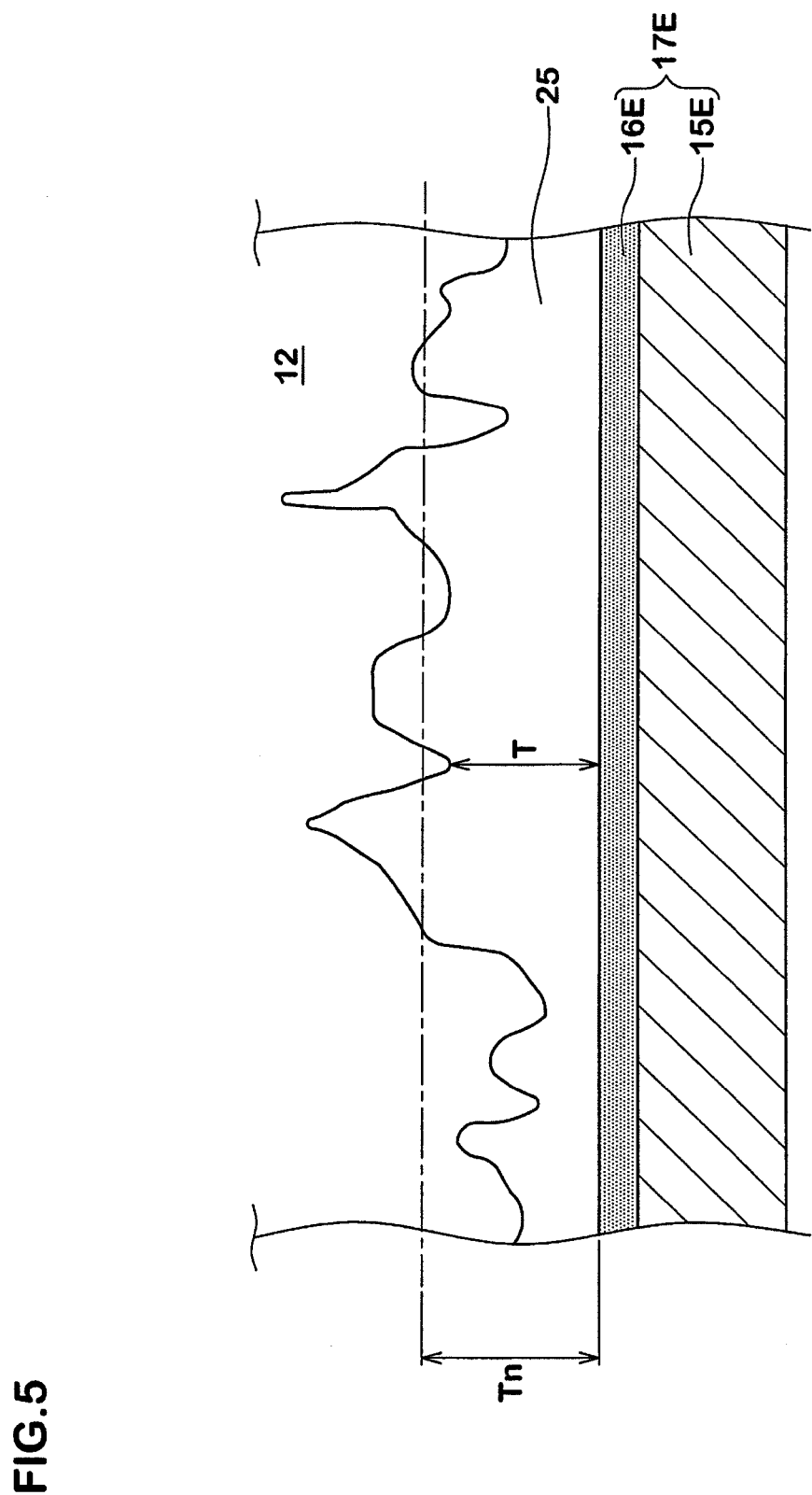
FIG. 5 is a conceptual view showing an adhesion reaction layer formed at the interface between a rubber and a brass plated layer.

Further, in order to further improve the wet heat adhesive property, it is preferable, as shown in FIG. 5, to set the average thickness of the adhesion reaction layer 25 (FIG. 5) in rubber vulcanization to the range of 50 to 1,000 nm.

As well known, the adhesive property between the brass plated layer 16E and the rubber 12 is exhibited by formation of an adhesion reaction layer 25 between the brass plated layer 16E and the rubber 12. The adhesion reaction layer 25 is formed from copper in the brass plated layer 16E and sulfur incorporated in the rubber 12 that cause a cross-linking reaction to combine each other during vulcanization of the rubber. In the wet heat deterioration state as mentioned above, if the average value Tn of the thicknesses T of the adhesion reaction layer 25 from the surface of the brass plated layer 16E is smaller than 50 nm, the adhesion reaction layer 25 is so thin that the adhesive strength is insufficient. On the other hand, if the average thickness Tn exceeds 1,000 nm, the cross-linking density of the adhesion reaction layer 25 decreases to cause reduction in adhesive strength. It is therefore preferable that the average thickness Tn of the adhesion reaction layer 25 is in the range of 50 to 1,000 nm. Particularly, from the viewpoint of the adhesive property, it is preferable that the lower limit is not less than 100 nm, and the upper limit is not more than 500 nm.

As stated above, the brass plated layer 16E may be a ternary alloy plating containing nickel or cobalt. However, in the case of adding nickel as a third metal, if the amount of nickel added is less than 1.0 part by weight based on 100 parts by weight of the plating, the plated layer 16E after wet heat deterioration tends to change to such a grain structure as causing peeling from this changed portion. On the other hand, if the amount of nickel added exceeds 10.0 parts by weight, the thickness T of the adhesion reaction layer 25 becomes thin to decrease the adhesive strength, and the plated layer 16E also becomes hard to deteriorate the wire drawing processability. Hence, the amount of nickel added is preferably within the range of 1.0 to 10.0 parts by weight.

Further, in the case of adding cobalt as a third metal, if the amount of cobalt added is less than 0.1 part by weight based on 100 parts by weight of the plating, the plated layer 16E after wet heat deterioration tends to change to such a grain structure as causing peeling from this changed portion. On the other hand, if the amount of cobalt added exceeds 5.0 parts by weight, the thickness T of the adhesion reaction layer 25 becomes thin to decrease the adhesive strength, and the plated layer 16E also become hard to deteriorate the wire drawing processability. Hence, the amount of cobalt added is preferably within the range of 0.1 to 5.0 parts by weight.

In the present example has been illustrated a case where the rubber-cord complex 9 is applied to a ply for tire reinforcement, particularly a belt ply. However, the rubber-cord complex 9 can also be applied to other plies for tire reinforcement, such as a carcass ply and a bead reinforcing ply. Further, the metal cord 10 may be used as a bead wire for forming a bead core 5. In such a case, the metal cord 10 is made of a single plated wire 17E, and it is considered that the pneumatic tire 1 itself constitutes the rubber-cord complex 9. In addition to those described above, the rubber-cord complex 9 is also applicable to a variety of rubber products such as a hose and a industrial belt. Further, as the material for the metal element wire 15 can be used, besides steel mentioned above, a variety of metal materials which are capable of forming the brass plated layer 16, such as aluminum, copper and titanium, and with the use of any of the metal materials, it is possible to effectively exert the above-mentioned action and effect.

A particularly preferable embodiment of the present invention has been described above in detail, but the present invention is not limited to the embodiment shown in the drawings and various changes and modifications can be made in practicing the invention.

EXAMPLES (1) A brass plated layer was formed on the surface of a steel wire having a diameter of 1.7 mm. The plated wire was then subjected to wire drawing treatment to give a drawn plated wire having a diameter of 0.27 mm.

The brass plating was carried out by any of the following methods.

(A) A copper plated layer and a zinc plated layer were successively formed and then subjected to a thermal diffusion treatment to form a binary alloy brass plated layer. This method is referred to as a method A.

(B) A copper plated layer, a zinc plated layer and a third metal plated layer were successively formed and then subjected to a thermal diffusion treatment to form a ternary alloy plated layer. This method is referred to as a method B.

(C) A copper plated layer and a zinc alloy (zinc/nickel alloy or zinc/cobalt alloy) plated layer were successively formed and then subjected to a thermal diffusion treatment to form a ternary alloy plated layer. This method is referred to as a method C.

At this time, the current density of the electroplating in formation of the primary plated layers (copper plated layer, zinc plated layer, third metal plated layer, zinc alloy plated layer) and the diffusion temperature were changed to change the grain structure state of the brass plated layer, namely the average grain size of crystal grains in the plated layer and the complexity (fractal dimension) of the irregularity of grain boundary. The brass plated layer of any of the drawn plated wire has the same average thickness of about 0.2 µm.

Both sides of an array of metal cords each of which is formed by twisting the drawn plated wires and has a 1×3 structure, were sandwiched between unvulcanized rubber sheets having the composition shown in Table 1, and then heated in a press-contacted state (165° C., 18 minutes) for vulcanization to give a sample of a cord ply. Each of the samples obtained in such a manner was then subjected to a peeling test, and the initial adhesive property and the wet heat adhesive property of the metal cords were compared.

The wet heat adhesive property was measured by allowing the above-mentioned sample to stand in an oven at a temperature of 80° C. and a relative humidity of 95% for 20 days and then subjecting the sample in a wet heat deterioration state to a peeling test. The initial adhesive property was measured by allowing the sample after the vulcanization to natural cooling at ordinary temperature and humidity [20° C., 50%(relative humidity)] and then subjecting it to a peeling test. The peeling test was conducted by peeling the sample from its one end along the rubber/metal cord interface at a speed of 50 mm/min., and the state of the metal cord surface at the interface was evaluated according to the following criteria.

5: The surface is fully covered with the rubber, and the plated layer surface of the steel cord is invisible.

4: The plated layer is visible at 3 to 6 places on the peeled surface.

3: The plated layer is visible at 11 to 16 places on the peeled surface.

2: The plated layer is visible at 21 or more places on the peeled surface, but not less than 60% of the whole plated layer surface is covered with the rubber.

1: The total area of the plated layer surface covered with the rubber is not less than 10% and less then 30%.

In Tables 2 to 4, the evaluation is performed with scores in steps of 0.5, where a surface state out of the integer score range applies such evaluation.

(2) A pneumatic tire (size: 195/65R15) using the above-mentioned steel cord as a belt cord was produced according to the following specification, and the high-speed durability of the tire was tested.

| (Belt layer) | |
|---|---|
| The number of plies: | 2 plies |
| Cord angle: | (+20°, −20°) |
| The number of cords: | 40 cords/5 cm |
| (Carcass) | |
| Cord: | 1,670 dtex/2 (polyester) |
| The number of plies: | 1 ply |
| Cord angle: | (90° C.) |
| The number of cords: | 50 cords/5 cm |

<High-Speed Durability Test>

Under conditions of an internal pressure of 280 kPa and a load of 492 kgf, a drum driving test apparatus was started at a speed of 170 km/h, and the speed was increased in stages by 10 km/h every 10 minutes. A distance driven until destruction of the tire was measured and shown as an index relative to the result of Comparative Example 1 taken as 100. The larger the value, the better the high-speed durability is.

TABLE 2

| | Example 1 | Example 2 | Example 3 | Example 4 | Example 5 | Example 6 | Comparative Example 1 |
|---|---|---|---|---|---|---|---|
| Plating method | A | A | B | B | B | B | A |
| Cu (parts by weight) | 62.7 | 63.1 | 65.1 | 67.2 | 69.2 | 66.8 | 65.2 |
| Zn (parts by weight) | 37.3 | 36.9 | 32.8 | 30.3 | 25.2 | 28.9 | 34.8 |
| Ni (parts by weight) | 0 | 0 | 0 | 25 | 5.6 | 0 | 0 |
| Co (parts by weight) | 0 | 0 | 2.1 | 0 | 0.9 | 4.3 | 0 |
| Average grain size of plating | | | | | | | |
| After wet heat deterioration <nm> | 46.5 | 48.0 | 45.3 | 43.5 | 45.6 | 42.3 | 68.0 |
| Fractal dimension of crystal grains | | | | | | | |
| Initial | 1.104 | 1.032 | 1.109 | 1.176 | 1.181 | 1.193 | 1.003 |
| After wet heat deterioration | 1.167 | 1.098 | 1.154 | 1.211 | 1.215 | 1.256 | 0.892 |

TABLE 2-continued

| | | | | | | | |
|---|---|---|---|---|---|---|---|
| Average thickness of adhesion reaction layer | | | | | | | |
| Initial <nm> | 72 | 63 | 57 | 58 | 55 | 52 | 65 |
| After wet heat deterioration <nm> | 615 | 783 | 418 | 354 | 214 | 374 | 1033 |
| Peeling resistance (adhesive property) | | | | | | | |
| Initial | 5.0 | 5.0 | 4.0 | 4.0 | 4.0 | 4.0 | 5.0 |
| After wet heat deterioration | 1.5 | 1.0 | 1.5 | 2.3 | 2.5 | 2.5 | 0.5 |
| High speed durability of tire <index> | 110 | — | 112 | — | — | — | 100 |

| | Comparative Example 2 | Comparative Example 3 | Comparative Example 4 | Comparative Example 5 | Comparative Example 6 | Example 7 |
|---|---|---|---|---|---|---|
| Plating method | A | B | B | B | B | C |
| Cu (parts by weight) | 62.4 | 64.8 | 65.4 | 63.4 | 68.9 | 69.0 |
| Zn (parts by weight) | 37.6 | 34.8 | 34.3 | 36.6 | 24.7 | 30.5 |
| Ni (parts by weight) | 0 | 0 | 0.3 | 11.3 | 0 | 0 |
| Co (parts by weight) | 0 | 0.4 | 0 | 0 | 6.4 | 0.5 |
| Average grain size of plating | | | | | | |
| After wet heat deterioration <nm> | 73.0 | 53.0 | 56.0 | 50.2 | 47.8 | 45.8 |
| Fractal dimension of crystal grains | | | | | | |
| Initial | 0.934 | 1.120 | 1.159 | 1.590 | 1.582 | 1.177 |
| After wet heat deterioration | 0.871 | 1.154 | 1.211 | 1.523 | 1.546 | 1.221 |
| Average thickness of adhesion reaction layer | | | | | | |
| Initial <nm> | 49 | 61 | 41 | 24 | 43 | 47 |
| After wet heat deterioration <nm> | 812 | 478 | 293 | 48 | 654 | 320 |
| Peeling resistance (adhesive property) | | | | | | |
| Initial | 5.0 | 5.0 | 5.0 | 2.5 | 3.0 | 4.0 |
| After wet heat deterioration | 0.5 | 0.5 | 0.5 | 0.5 | 0.5 | 2.5 |
| High speed durability of tire <index> | 87 | — | — | — | — | 115 |

TABLE 3

| | Example 8 | Comparative Example 7 | Example 11 | Example 12 | Example 13 | Example 14 | Example 15 |
|---|---|---|---|---|---|---|---|
| Plating method | C | C | B | B | B | B | B |
| Cu (parts by weight) | 67.9 | 68.8 | 66.4 | 65.9 | 67.7 | 67.2 | 68.1 |
| Zn (parts by weight) | 28.2 | 30.2 | 32.2 | 32.3 | 30.2 | 27.6 | 25.3 |
| Ni (parts by weight) | 0 | 0 | 1.4 | 1.8 | 2.1 | 5.2 | 6.6 |
| Co (parts by weight) | 3.9 | 1.0 | 0 | 0 | 0 | 0 | 0 |
| Average grain size of plating | | | | | | | |
| After wet heat deterioration <nm> | 43.2 | 49.0 | 45.8 | 44.3 | 43.2 | 40.3 | 39.8 |
| Fractal dimension of crystal grains | | | | | | | |
| Initial | 1.153 | 1.520 | 1.018 | 1.103 | 1.135 | 1.109 | 1.121 |
| After wet heat deterioration | 1.202 | 1.542 | 1.123 | 1.142 | 1.178 | 1.135 | 1.158 |
| Average thickness of adhesion reaction layer | | | | | | | |
| Initial <nm> | 40 | 28 | 61 | 59 | 58 | 55 | 54 |
| After wet heat deterioration <nm> | 265 | 302 | 554 | 439 | 392 | 201 | 198 |

TABLE 3-continued

| Peeling resistance (adhesive property) | | | | | | | |
|---|---|---|---|---|---|---|---|
| Initial | 4.0 | 3.0 | 5.0 | 5.0 | 5.0 | 3.0 | 2.5 |
| After wet heat deterioration | 3.0 | 0.5 | 1.0 | 2.0 | 2.0 | 2.0 | 2.0 |
| High speed durability of tire <index> | 120 | 89 | — | — | 115 | — | — |

| | Example 16 | Example 17 | Example 18 | Example 19 | Example 20 | Comparative Example 11 |
|---|---|---|---|---|---|---|
| Plating method | B | B | B | B | B | B |
| Cu (parts by weight) | 69.4 | 66.5 | 68.5 | 66.9 | 68.3 | 65.2 |
| Zn (parts by weight) | 23.3 | 25.1 | 28.6 | 29.4 | 27.4 | 34.6 |
| Ni (parts by weight) | 7.3 | 8.4 | 2.9 | 3.7 | 4.3 | 0.2 |
| Co (parts by weight) | 0 | 0 | 0 | 0 | 0 | 0 |
| Average grain size of plating | | | | | | |
| After wet heat deterioration <nm> | 39.2 | 37.6 | 42.3 | 44.0 | 44.8 | 54.2 |
| Fractal dimension of crystal grains | | | | | | |
| Initial | 1.121 | 1.118 | 1.068 | 1.145 | 1.135 | 1.125 |
| After wet heat deterioration | 1.158 | 1.146 | 1.185 | 1.187 | 1.167 | 0.889 |
| Average thickness of adhesion reaction layer | | | | | | |
| Initial <nm> | 53 | 52 | 57 | 56 | 55 | 40 |
| After wet heat deterioration <nm> | 182 | 152 | 344 | 312 | 293 | 289 |
| Peeling resistance (adhesive property) | | | | | | |
| Initial | 2.5 | 1.5 | 4.0 | 3.5 | 3.0 | 5.0 |
| After wet heat deterioration | 2.0 | 1.5 | 2.0 | 2.0 | 2.0 | 0.5 |
| High speed durability of tire <index> | — | — | — | — | — | 103 |

TABLE 4

| | Comparative Example 12 | Comparative Example 13 | Example 21 | Example 22 | Example 23 | Example 24 | Example 25 |
|---|---|---|---|---|---|---|---|
| Plating method | B | B | B | B | B | B | B |
| Cu (parts by weight) | 63.1 | 65.2 | 62.6 | 63.6 | 63.1 | 62.8 | 64.3 |
| Zn (parts by weight) | 36.5 | 23.8 | 36.8 | 35.1 | 35.1 | 34.8 | 32.6 |
| Ni (parts by weight) | 0.4 | 11.0 | 0 | 0 | 0 | 0 | 0 |
| Co (parts by weight) | 0 | 0 | 0.6 | 1.3 | 1.8 | 2.4 | 3.1 |
| Average grain size of plating | | | | | | | |
| After wet heat deterioration <nm> | 48.3 | 50.3 | 46.8 | 45.8 | 44.3 | 40.0 | 43.8 |
| Fractal dimension of crystal grains | | | | | | | |
| Initial | 1.012 | 1.580 | 1.018 | 1.103 | 1.135 | 1.109 | 1.121 |
| After wet heat deterioration | 0.977 | 1.525 | 1.098 | 1.142 | 1.178 | 1.135 | 1.158 |
| Average thickness of adhesion reaction layer | | | | | | | |
| Initial <nm> | 39 | 25 | 62 | 59 | 58 | 56 | 54 |
| After wet heat deterioration <nm> | 302 | 49 | 662 | 572 | 484 | 435 | 403 |
| Peeling resistance (adhesive property) | | | | | | | |
| Initial | 5.0 | 1.0 | 5.0 | 4.0 | 4.0 | 4.0 | 4.0 |
| After wet heat deterioration | 0.5 | 0.5 | 1.5 | 1.5 | 1.5 | 2.0 | 2.0 |

TABLE 4-continued

| | | | | | | |
|---|---|---|---|---|---|---|
| High speed durability of tire <index> | 92 | — | — | — | — | 114 | — |

| | Example 26 | Example 27 | Comparative Example 21 | Comparative Example 22 | Comparative Example 23 | Comparative Example 24 |
|---|---|---|---|---|---|---|
| Plating method | B | B | B | B | B | B |
| Cu (parts by weight) | 64.1 | 65.2 | 65.2 | 63.1 | 65.2 | 65.2 |
| Zn (parts by weight) | 31.7 | 30.0 | 34.6 | 36.5 | 29.1 | 34.8 |
| Ni (parts by weight) | 0 | 0 | 0 | 0 | 0 | 0 |
| Co (parts by weight) | 4.2 | 4.8 | 0.2 | 0.4 | 5.7 | 6.2 |
| Average grain size of plating | | | | | | |
| After wet heat deterioration <nm> | 42.5 | 42.1 | 59.2 | 56.3 | 48.8 | 51.2 |
| Fractal dimension of crystal grains | | | | | | |
| Initial | 1.118 | 1.126 | 1.125 | 1.012 | 1.5805 | 1.558 |
| After wet heat deterioration | 1.146 | 1.162 | 1.889 | 0.977 | 1.5257 | 1.541 |
| Average thickness of adhesion reaction layer | | | | | | |
| Initial <nm> | 53 | 51 | 63 | 62 | 47 | 43 |
| After wet heat deterioration <nm> | 387 | 351 | 1032 | 483 | 348 | 332 |
| Peeling resistance (adhesive property) | | | | | | |
| Initial | 4.0 | 3.5 | 5.0 | 5.0 | 1.0 | 1.0 |
| After wet heat deterioration | 2.5 | 2.0 | 0.5 | 0.5 | 0.5 | 0.5 |
| High speed durability of tire <index> | — | — | 104 | — | — | — |

As shown in the tables, it can be confirmed from the peeling test that the metal cords of the examples according to the present invention are excellent in adhesive property after wet heat deterioration to the rubber. Further, it can also be confirmed from the high-speed durability test that reduction in adhesive property due to heat can be suppressed to thereby allow improvement in high-speed durability of tires.

What is claimed is:

1. A method of producing a rubber-cord complex obtained by vulcanizing and bonding a rubber to a metal cord comprising at least one drawn plated wire having a brass plated layer, wherein in a wet heat deterioration state after being held in an atmosphere having a temperature of 80° C. and a relative humidity of 95% for 20 days, said rubber-cord complex has the average grain size of crystal grains present in the brass plated layer being not more than 50 nm, and the grain boundary of the crystal grains having a fractal dimension of 1.001 to 1.500, said method comprising:

a plating step for forming the brass plated layer containing copper, zinc, and cobalt on the surface of a metal wire;
a drawing step for drawing the plated wire provided with the brass plated layer by said plating step so as to obtain said drawn plated wire;
a vulcanizing step for vulcanizing and bonding a rubber to the metal cord comprising said drawn plated wire; and
said plating step comprising:
forming a copper plated layer on the surface of a metal element wire by an electroplating treatment in a copper plating bath wherein a current density of said electroplating treatment for the copper plated layer is 15 to 25 A/dm²;
forming a plated layer of an alloy of zinc and cobalt on said copper plated layer by an electroplating treatment in an alloy bath containing zinc and cobalt wherein a current density of said electroplating treatment for the plated layer of the alloy of zinc and cobalt is 40 to 60 A/dm²; and
forming the brass plated layer by thermal diffusion of the copper plated layer and the plated layer of the alloy of zinc and cobalt,
wherein the thermal diffusion is conducted by a low temperature diffusion at a temperature of 500 to 550° C.

2. A method of producing a metal cord comprising at least one drawn plated wire having a brass plated layer, said method comprising:

a plating step for forming the brass plated layer containing copper, zinc, and cobalt on the surface of a metal wire;
a drawing step for drawing the plated wire provided with the brass plated layer by said plating step so as to obtain said drawn plated wire;
a vulcanizing step for vulcanizing and bonding a rubber to the metal cord comprising said drawn plated wire; and
said plating step comprising:
forming a copper plated layer on the surface of a metal element wire by an electroplating treatment in a copper plating bath wherein a current density of said electroplating treatment for the copper plated layer is 15 to 25 A/dm²;
forming a plated layer of an alloy of zinc and cobalt on said copper plated layer by an electroplating treatment in an alloy bath containing zinc and cobalt wherein a current density of said electroplating treatment for the plated layer of the alloy of zinc and cobalt is 40 to 60 A/dm²; and
forming the brass plated layer by thermal diffusion of the copper plated layer and the plated layer of the alloy of zinc and cobalt, wherein the thermal diffusion is conducted by a low temperature diffusion at a temperature of 500 to 550° C.

3. A method of producing a rubber-cord complex obtained by vulcanizing and bonding a rubber to a metal cord comprising at least one drawn plated wire having a brass plated layer, wherein in a wet heat deterioration state after being held in an atmosphere having a temperature of 80° C. and a relative humidity of 95% for 20 days, said rubber-cord complex has the average grain size of crystal grains present in the brass plated layer being not more than 50 nm, and the grain boundary of the crystal grains having a fractal dimension of 1.001 to 1.500, said method comprising:

a plating step for forming the brass plated layer containing copper, zinc, and cobalt on the surface of a metal wire;

a drawing step for drawing the plated wire provided with the brass plated layer by said plating step so as to obtain said drawn plated wire;

a vulcanizing step for vulcanizing and bonding a rubber to the metal cord comprising said drawn plated wire; and said plating step comprising:

forming a copper plated layer on the surface of a metal element wire by an electroplating treatment in a copper plating bath wherein a current density of said electroplating treatment for the copper plated layer is 15 to 25 A/dm$^2$;

forming a zinc plated layer on said copper plated layer by an electroplating treatment in a zinc plating bath wherein a current density of said electroplating treatment for the zinc plated layer is 40 to 60 A/dm$^2$;

forming a cobalt plated layer on said zinc plated layer by an electroplating treatment in a cobalt bath wherein a current density of said electroplating treatment for the cobalt plated layer is 30 to 40 A/dm$^2$; and forming the brass plated layer by thermal diffusion of the copper plated layer, the zinc plated layer and the cobalt plated layer, wherein the thermal diffusion is conducted by a low temperature diffusion at a temperature of 500 to 550° C.

4. A method of producing a metal cord comprising at least one drawn plated wire having a brass plated layer, said method comprising:

a plating step for forming the brass plated layer containing copper, zinc, and cobalt on the surface of a metal wire;

a drawing step for drawing the plated wire provided with the brass plated layer by said plating step so as to obtain said drawn plated wire;

a vulcanizing step for vulcanizing and bonding a rubber to the metal cord comprising said drawn plated wire; and said plating step comprising:

forming a copper plated layer on the surface of a metal element wire by an electroplating treatment in a copper plating bath wherein a current density of said electroplating treatment for the copper plated layer is 15 to 25 A/dm$^2$;

forming a zinc plated layer on said copper plated layer by an electroplating treatment in a zinc plating bath wherein a current density of said electroplating treatment for the zinc plated layer is 40 to 60 A/dm$^2$;

forming a cobalt plated layer on said zinc plated layer by an electroplating treatment in a cobalt bath wherein a current density of said electroplating treatment for the cobalt plated layer is 30 to 40 A/dm$^2$; and forming the brass plated layer by thermal diffusion of the copper plated layer, the zinc plated layer and the cobalt plated layer, wherein the thermal diffusion is conducted by a low temperature diffusion at a temperature of 500 to 550° C.

* * * * *